United States Patent [19]
Rosengren et al.

[11] Patent Number: 5,555,789
[45] Date of Patent: Sep. 17, 1996

[54] LINEAR MOTION DEVICE

[75] Inventors: Gary W. Rosengren, Brooklyn Park; Philip M. Poeschl, Roseville, both of Minn.

[73] Assignee: Tol-O-Matic, Inc., Hamel, Minn.

[21] Appl. No.: 408,487

[22] Filed: Mar. 22, 1995

[51] Int. Cl.⁶ .................................................. F16J 15/18
[52] U.S. Cl. ............................ 92/165 R; 92/88; 384/57
[58] Field of Search ...................... 92/88, 165 R; 384/45, 57

[56] References Cited

U.S. PATENT DOCUMENTS

| | | | |
|---|---|---|---|
| 3,484,944 | 12/1969 | Pryshlak | 384/57 |
| 3,790,233 | 2/1974 | Polidor | 384/57 |
| 4,614,382 | 9/1986 | Teramachi | 384/45 |
| 4,769,565 | 9/1988 | Teramachi | 384/45 |
| 5,275,088 | 1/1994 | Takada et al. | 92/88 |
| 5,374,128 | 12/1994 | Herbeck | 384/57 |

*Primary Examiner*—Thomas E. Denion
*Attorney, Agent, or Firm*—Dorsey & Whitney P.L.L.P.

[57] ABSTRACT

A linear motion device having an elongated body a carriage moveable in a linear path relative to the body and a bearing positioned between the carriage and body for supporting the carriage for movement along the linear path. The bearing includes a side rail adjustably connected to the body and bearing elements between the carriage and the side rail.

20 Claims, 5 Drawing Sheets

LINEAR MOTION DEVICE

BACKGROUND OF THE INVENTION

1. Field of the Invention

The present invention relates generally to the field of linear motion devices and more particularly to a pneumatic or rodless cylinder having a carriage moveable relative to a body and a bearing means for supporting and guiding reciprocal movement of the carriage relative to the body.

2. Description of the Prior Art

A variety of linear motion devices currently exist in the art. Many are of the type which include a body, a carriage moveable relative to the body and bearing or a support means positioned between the carriage and the body for purposes of supporting and guiding the carriage during movement relative to the body. Pneumatic or rodless cylinders represent one such form of linear motion device. These devices generally include an elongated cylinder body, a piston reciprocally moveable within the cylinder body and a carriage connected to the piston either directly or indirectly for transferring reciprocal movement of the piston to a workpiece. Such devices also include various bearing or other means for supporting and guiding the carriage during its reciprocal movement relative to the cylinder body.

One such means is shown in U.S. Pat. No. 4,724,744 issued to Rosengren in which a pair of integral arms extend outwardly from the carriage and embody a pair of low friction rods for sliding movement relative to a bearing groove in the outer side surfaces of the cylinder. A further guide and support mechanism is illustrated in U.S. Pat. No. 4,878,390 issued to Hauser. Hauser discloses a linear positioning apparatus having a cylinder body, a carriage moveable relative to the body and a bearing means comprising a series of recirculating ball bearings for guiding and supporting the carriage relative to the cylinder body.

Regardless of the particular bearing means utilized to support movement of the carriage relative to the body, the selection and design of such bearing means necessarily involves the consideration of several factors including the nature of the cylinder body, the method by which such body is manufactured, the reaction of the body to dynamic forces during operation, the tolerances achievable with a certain cylinder body design, and the tolerances needed for a particular bearing design.

Pneumatic or rodless cylinders of the type to which the present invention has particular application, commonly embody cylinder bodies which are relatively long compared to the carriage dimensions. It is not uncommon for such cylinder bodies to be 20 feet long or longer. This makes it extremely difficult to maintain close tolerances along the entire body length. Further, most of these elongated bodies for these pneumatic cylinders are extruded rather than machined. This further compounds the problem of maintaining close tolerances. Still further, pressures within the cylinder which drive the piston cause the cylinder to repeatedly expand and contract during reciprocal movement of the piston, thus presenting further problems with respect to establishing and maintaining tolerances.

Accordingly, there is a need in the art for a linear motion device and more particularly for a pneumatic or rodless cylinder device having an improved bearing support structure which minimizes the need to maintain close tolerances during manufacture of the component parts, but which still facilitates easy assembly of the device with the desired close tolerances.

SUMMARY OF THE INVENTION

In contrast to the prior art, the present invention provides for a linear motion device having an improved bearing support structure which facilitates manufacture of such device, including its component parts, with significantly greater flexibility with respect to maintaining tolerances, but which still results in a device having relatively close tolerances. More specifically, the preferred structure of the present invention includes an elongated cylinder body, a reciprocally moveable piston within the cylinder and a carriage mounted to the piston for reciprocal movement therewith. An improved linear bearing means is provided between the carriage and the cylinder for supporting and guiding the carriage relative to the cylinder during relative movement therebetween. In the preferred embodiment, the bearing means includes at least one adjustably connectable side rail connected to the cylinder. Such rail includes an elongated bearing receiving recess and a clamp means for retaining a bearing member within the receiving recess. The clamp means as well as the means for connecting the side rail to the cylinder body enable the elongated cylinder body and the elongated side rail to be manufactured with a significantly greater degree of tolerance, but which, when assembled, results in a device with desired close tolerances. This in turn significantly reduces manufacturing costs and facilitates use of bearing mechanisms which would otherwise be impractical because of tolerance requirements.

Accordingly, it is an object of the present invention to provide a linear motion device having an improved bearing means for supporting and guiding a carriage for reciprocal, linear movement relative to a body member.

Another object of the present invention is to provide an improved pneumatic or rodless cylinder having a reciprocally moveable piston and a carriage mounted thereto together with an improved linear bearing mechanism.

A still further object of the present invention is to provide an improved bearing system for a linear motion device including an improved bearing means facilitating greater manufacturing tolerances.

These and other objects of the present invention will become apparent with reference to the drawings, the description of the preferred embodiment and the appended claims.

DESCRIPTION OF THE PREFERRED EMBODIMENT

In the following description, references to the terms right and left, top and bottom, upper and lower, and horizontal and vertical are to be read and understood with their conventional meanings and with reference to viewing the present invention as it is shown in the drawings.

Figure 1:
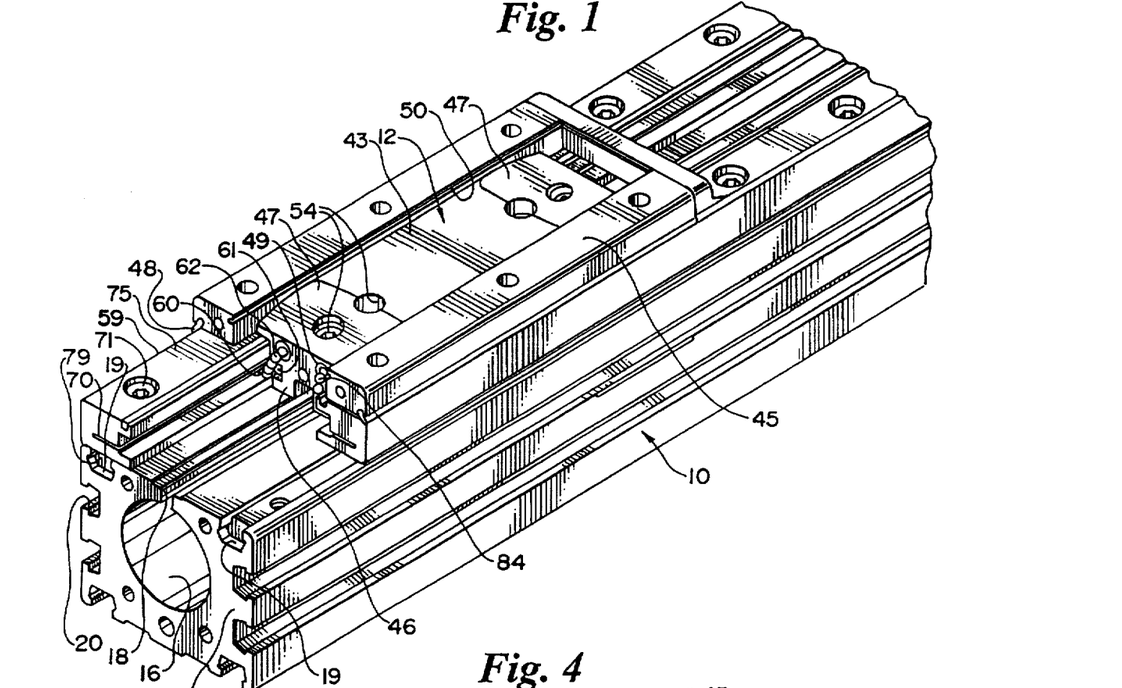
FIG. 1 is an isometric view of a portion of the linear motion device of the present invention, with portions removed and broken away, showing the carriage mounted to the cylinder body.
Figure 2A:
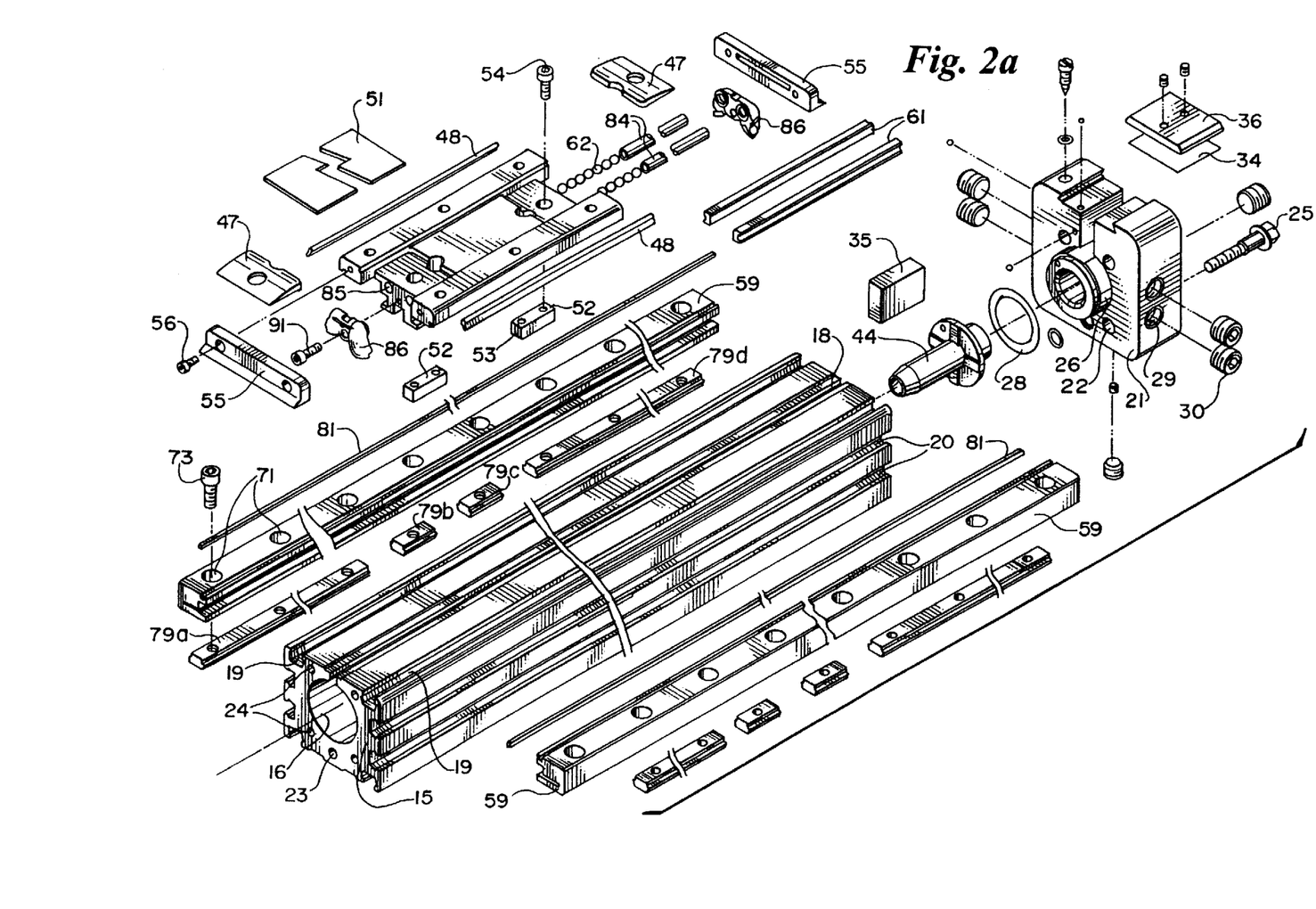
FIG. 2 is comprised of FIGS. 2A and 2B, and is an exploded, isometric view of the linear motion device of the present invention.
Figure 2B:
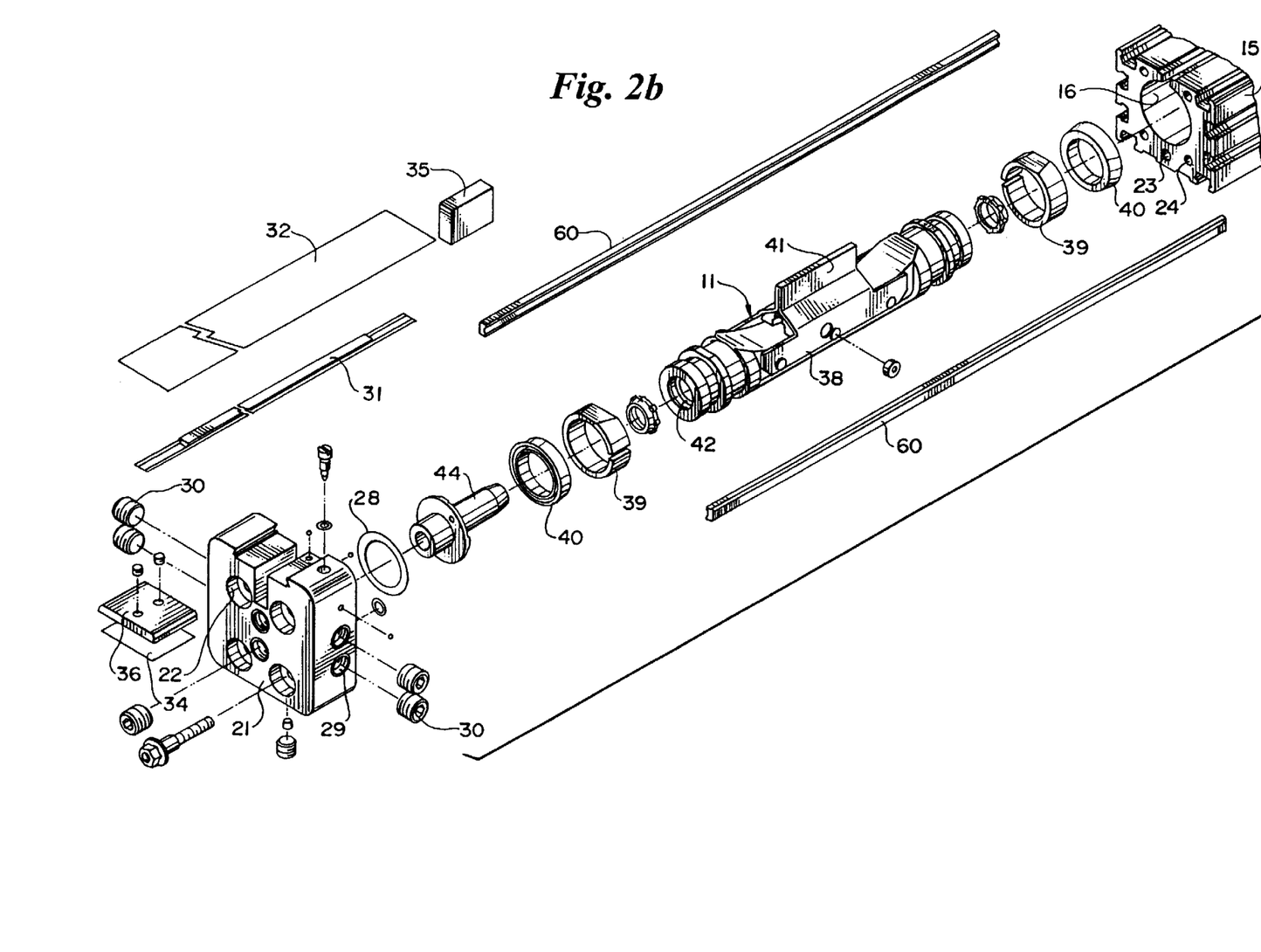

Reference is first made to FIG. 1 showing an isometric view of a portion of the linear motion device of the present invention and FIG. 2, comprised of FIGS. 2A and 2B, showing an isometric exploded view of the entire device. The present invention relates generally to a linear motion device of the type having an elongated body, a carriage movable relative to the body, and a bearing means for guiding and supporting the carriage during movement relative to the body. In the preferred embodiment, the linear motion device is a pressure cylinder device commonly referred to in the art as a pneumatic or rodless cylinder. The pneumatic cylinder of the present invention includes an elongated cylinder assembly 10, a piston assembly 11 reciprocally moveable within the cylinder 10 and a carriage assembly 12 connected with the piston 11 and moveable therewith. A bearing means 14 (FIG. 1) is positioned between the carriage 12 and the cylinder 10 for guiding and supporting the carriage 12 during movement relative to the cylinder.

Figure 3:
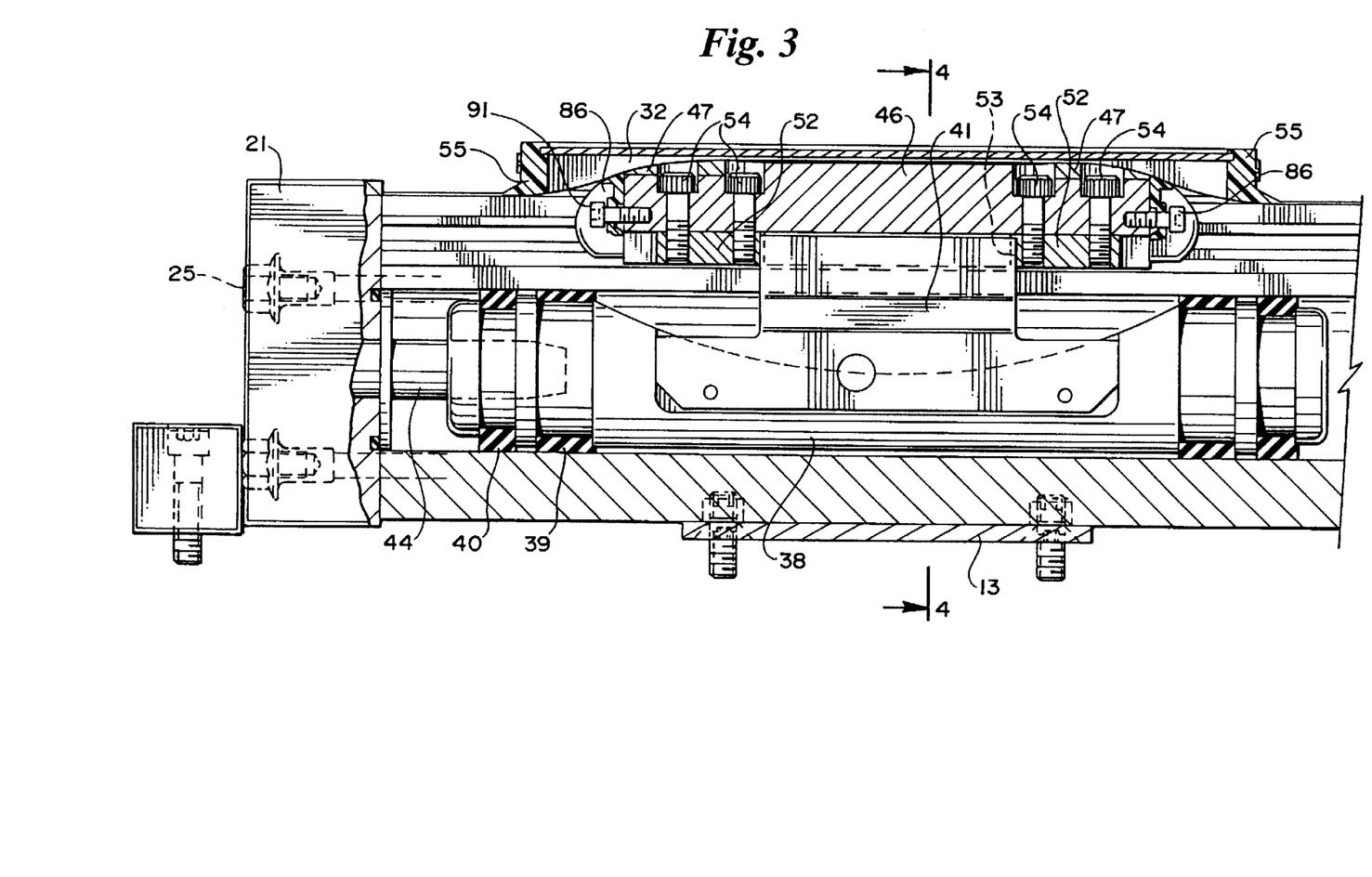
FIG. 3 is a side elevational view with portions broken away and partially in section showing the piston, the carriage and a portion of the cylinder body.
Figure 4:
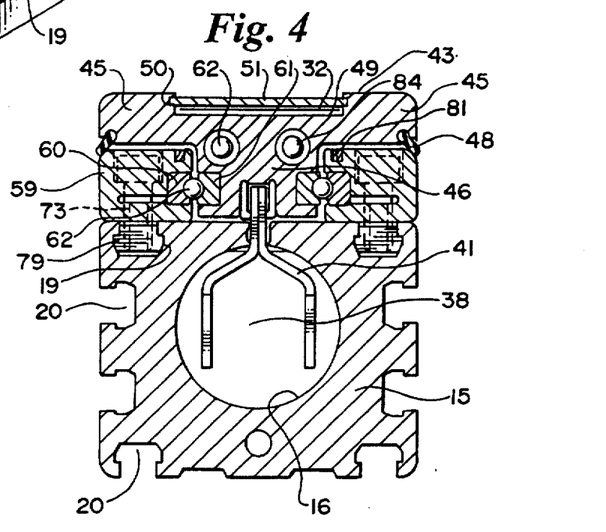
FIG. 4 is a view, partially in section, as viewed along the section line 4—4 of FIG. 3.

More specifically, as illustrated best in FIGS. 1, 2 and 4, the cylinder assembly 10 includes an elongated cylinder or cylinder body 15 having an inner bore 16 extending throughout the entire length of the cylinder along its longitudinal axis. In the preferred embodiment, the bore 16 is cylindrical, although it could be oval, square or a variety of other shapes as well. The cylinder 15 includes a pair of outer side walls and outer top and bottom walls. An elongated slot 18 is formed between the top wall of the cylinder 15 and the bore 16. In some cylinder embodiments, such as embodiments where the piston and carriage are magnetically coupled, the slot can be eliminated. A pair of side rail connection channels 19 are formed in the top wall of the cylinder 15 and on opposite sides of the slot 18. Both the slot 18 and the channels 19 extend the entire length of the cylinder 15. A plurality of mounting or accessory connection channels 20 are also formed in the side and bottom walls for mounting the cylinder 15 to a base 13 (FIG. 3) or other support member or for connecting accessory elements to the cylinder 15. In the preferred embodiment, the cylinder is extruded and is constructed of a lightweight metal such as aluminum.

An end cap or head assembly 21 (FIG. 2) is connected to each end of the cylinder body 15. Each end cap 21 is provided with a plurality of openings 22 which are generally aligned with corresponding threaded openings 24 in the ends of the cylinder 15. A like number of threaded members 25 extend through the openings 22 for threaded connection with the openings 24 to secure the end cap 21 to the body 15. Each end cap 21 further includes an inwardly extending portion 26 for insertion into the cylindrical bore 16. A peripheral surface of each of these portions 26 is provided with an O-ring or other sealing member 28. The O-ring 28 engages the inner surface of the bore 16 to provide a seal between the end cap 21 and the cylinder 15. Each end cap 21 is also provided with a plurality of ports 29 which are either plugged by corresponding plugs 30 or are connected with a source of pneumatic pressure. When selected ports are connected with a source of pneumatic pressure, the pressure can be selectively directed to pressure chambers within the cylinder 15 on opposite sides of the piston 11. Pressure to such chambers can be supplied from both ends of the cylinder 15 or selectively from one end via the port 23 which extends from one end of the cylinder to the other. Means are also provided for successively sealing the cylinder slot 18 and for providing a dust cover over the bearing means 14 during reciprocal movement of the piston 11 and carriage 12. In the preferred embodiment, the slot sealing means is comprised of the elongated seal member 31, while the dust cover is comprised of a relatively flat and thin steel dust band 32. These elements are secured to each of the end caps 21 by the connection members 34, 35 and 36. The actual construction of members such as the seal 31 and the dust band 32 and their connection to the end caps is well-known in the art.

The piston assembly 11 is adapted for reciprocal movement within the cylindrical bore 16 and includes a main piston body 38 comprised of a centrally located portion and a pair of opposite ends. Each end of the piston body 38 is provided with a wear ring 39 for maintaining the piston in a centered position within the bore 16 and a seal member 40 for sealing engagement with the inner surface of the cylinder bore 16. The seals 40, together with the end caps 21, define the ends of the pressure chambers on opposite ends of the piston 11. By selectively introducing pressure into these chambers, the piston 11 can be reciprocally moved along the cylinder body 15.

As illustrated best in FIGS. 3 and 4 and as will be described in greater detail below, a piston bracket 41 is connected with the central portion of the piston body 38 and extends upwardly through the slot 18 for connection with the carriage 12. The piston body 38 further includes ramp and guide portions for guiding movement of the seal member 31 into and out of sealing engagement with the slot 18 during reciprocal movement along the cylinder. Such structure is known in the art. Each of the piston ends is provided with an opening 42 for engagement with a cushion plug 44 to cushion the stopping of the piston at each end of the cylinder. The plugs 44 are mounted to the end caps of 21 and function in a manner known in the art.

With continuing reference to FIGS. 1–4, the carriage assembly 12 comprises a carriage or carrier body 43 having a generally T-shaped cross-sectional configuration, a central portion 46 and a pair of outwardly extending side edge portions 45. Each of the side edge portions 45 is provided with an elongated recess for receiving an elongated flexible seal member 48. As shown best in FIG. 4, a distal edge of the seal members 48 engages a top surface of the side rails 59 to keep dust and other contaminants from the bearings associated with the carriage 12. The top central portion of the carrier body 43 includes a recessed section 49 for receiving the dust band 32. A pair of wedge shaped upper band ramps 47 are provided on opposite ends of the recessed section 49 to assist in guiding the dust band 32 through the carriage. A retaining slot 50 is provided on each side of the recess 49 for retaining a plastic cover 51. During operation, the dust band 32 is positioned within the area defined by the recess 49 and the cover 51.

As illustrated best in FIGS. 3 and 4, the carrier body 43 is connected with the piston bracket 41 via a pair of connection lugs 52 secured to the central portion 46 of the carrier body 43 by the threaded members 54. The lugs 52 are positioned on opposite ends of the bracket 41 so as to capture the bracket 41, thus resulting in movement of the carriage 12 with the piston 11. As shown best in FIG. 2A, each of the lugs 52 is provided with an alignment slot 53 for maintaining the piston 11 in proper orientation and to prevent its rotation within the bore 16 during reciprocal movement. An end cap or strip 55 is connected with each end of the carriage 12 by a pair of threaded screws 56. As illustrated best in FIG. 3, each of the end caps 55 includes a lower wiper edge for wiping engagement with the top surface of the dust band 32 and the side rails 59 to wipe dust and other impurities from these surfaces and to prevent such materials from exposure to the bearing assembly.

The bearing assembly is positioned between the carriage 12 and the cylinder assembly 10 for supporting and guiding reciprocal movement of the carriage 12 relative to the cylinder body 15. In general, the bearing means includes a side rail 50, a first bearing member in the form of the outer race 60 connected with the rail and a second bearing member in the form of the inner race 61 associated with the carriage for bearing cooperation relative the outer race 60. In the preferred embodiment, the linear bearing means further includes a plurality of recirculating ball bearings 62 following an endless path between the inner and outer races 61 and 60 and through bearing openings in the carriage 12.

The main body of the carriage 12 is manufactured via an extrusion process from a light-weight metal such as aluminum. Each side surface of the central portion 46 of the carriage 12 is provided with an extruded race receiving recess 64 having a C-shaped cross-sectional configuration for receiving the inner bearing race 61. The recesses 64 are dimensioned to permit the inner race members 61 to be retained within the recesses 64 by a pressfit. In the preferred embodiment, each inner race 61 is constructed of a hardened metal such as steel or the like and includes a ball bearing receiving groove 65. Preferably the recesses 64 are provided with an inwardly extending lip at its outer edge for assistance in retaining the races 61 within the recesses 64. Each of the inner race members 61 extends the entire length of the carrier body 43.

Each of the side rails 59 comprises an elongated, extruded member having top 75, bottom 76 and side 74, 78 walls and further having a bearing receiving recess 68 for receiving the outer race member 60. The recess 68 extends the entire length of the rail 59 and its outer edges are provided with race retaining lips 69 to assist in retaining the race 60 within the recess 68. The recess 68 has a generally C-shaped cross-sectional figuration with top and bottom walls, a back wall and an open front to receive the race 60. One edge of each of the top and bottom walls is provided with one of the lips 69 while the other edge is joined with the back wall to define the C-shaped recess 68. Integrally joined with the back wall of the recess 68 is a clamp means in the form of a clamping slot 70 having a front end which opens into the C-shaped recess 68. The slot 70 extends rearwardly or away from the back wall of the recess 68 to a closed end 77 as shown. Similar to the recess 68, the clamping slot 70 extends the entire length of the rail member 59. Each of the side rails 59 is provided with a plurality of connection openings 72 extending through the side rail 59 and through the clamping slot 70. Each opening 72 is enlarged at its upper end 71 to receive the head of a threaded member 73. The side rails 59 are connected with the cylinder body 15 by a plurality of the threaded members 73 which extend through the counter bore 72 and into a nut rail 79 captured within the retaining slot 19. The rail nut 79 is preferably comprised of a plurality of rail sections 79a, 79b, 79c and 79d (FIG. 2) which are designed to slidably fit within the retaining slots 19. Each of the rail nut sections 79 includes one or more threaded openings to receive the threaded members 73.

Figure 5:
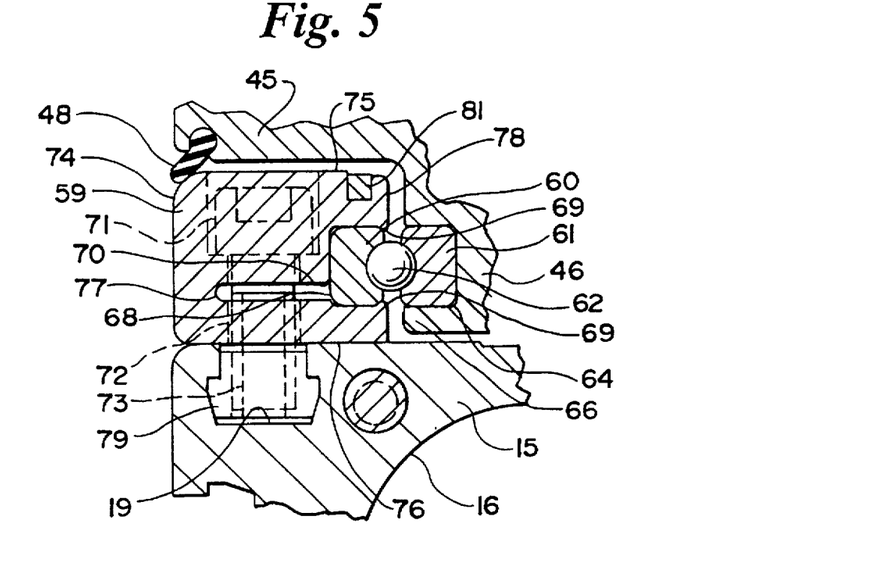
FIG. 5 is an enlarged view, partially in section, of one of the side race retaining rails together with associated structure.

With the rail structure described above, tightening of the threaded members 73 into the rail nuts 79 performs two functions. First, because of the presence of the clamping slot 70, tightening of the threaded members 73 results in a clamping action or squeezing against the outer race 60 within the recess 68, thus securely retaining the race 60 relative to the rail 59. Secondly, tightening of the threaded members 73 results in the side rail 59 being rigidly secured to the top mounting surface of the cylinder 15. In the preferred structure, a slight enlargement (on the order of about 0.031 inches) of the diameter of the bore 72 relative to the diameter of the threaded member 73 is provided. This permits limited adjustability of the position of the side rail 59, and thus the outer race 60, relative to the cylinder 15 and correspondingly facilitates limited adjustability of the outer race 60 relative to the inner race 61. To insure the clamping action resulting from the clamping slot 70, it is necessary for the closed end 77 of the slot 70 to extend at least partially into the bore 72. In the preferred embodiment, the closed end 77 extends completely past the bore 72 as best shown in FIG. 5.

An elongated magnet receiving recess 80 is provided in the top wall 75 of the side rail 59 for receiving an elongated magnet 81. The magnet 81 is retained within the recess 80 by a press fit and functions to retain the metal dust band 32 in an operative position adjacent to the top surface 79 on both ends of the carriage assembly 12. One side of the recess 80 is formed by the shoulder 82 with a top edge slightly below the uppermost surface of the top wall 75. This difference in height is sufficient to accommodate the thickness of the dust band 32.

The bearing positioned between the carriage 12 and the cylinder body 10 includes what is referred to in the present invention as a linear bearing. The term linear bearing is a bearing member or bearing means which enables one element to move relative to a second element along a linear path. Thus, in the embodiment of the present invention, the linear bearing enables the carriage 12 to be supported and moved relative to the cylinder body 15, and specifically the side rails 59, along a linear path. It is contemplated that the linear bearing could comprise a variety of different structures. For example, the linear bearing could comprise a low-friction bearing rod or the like positioned between the carriage 10 and the rail 59 and connected with one of those elements or it could be a series of ball bearings or the like which ride in inner and outer races connected respectively to the carriage 12 and to the side rail 59. Further, a linear bearing means comprised of a plurality of ball bearings can either be a bearing structure in which a plurality of adjacent ball bearings are captured in a race or can be similar to the structure of the preferred embodiment in which the plurality of ball bearings circulate through the carriage 12 as it moves relative to the cylinder 10.

The bearing means in accordance with the preferred embodiment comprises what is referred to as a circulating ball bearing structure having an endless bearing path and a plurality of ball bearings positioned within the path. A first linear portion of the bearing path is defined by the inner and outer race members 61 and 60 described above, while a second linear portion of the bearing path is defined by the bearing tubes 84, 84 positioned within bores 85, 85 extending through the carriage body 43. The remainder of the bearing path is defined by the plastic ball return elements 86, 86 connected to each end of the carriage body 43. As illustrated best in FIGS. 6 and 7, each of the ball returns 86 includes a pair of upper openings 88 and a corresponding pair of lower openings 89 which are joined together to form a pair of curved pathways of generally circular cross-section. These curved pathways function to connect the linear bearing path portions defined by the sleeves 84 with the linear bearing path defined by the inner and outer races 61, 60.

Figures 6, 7:
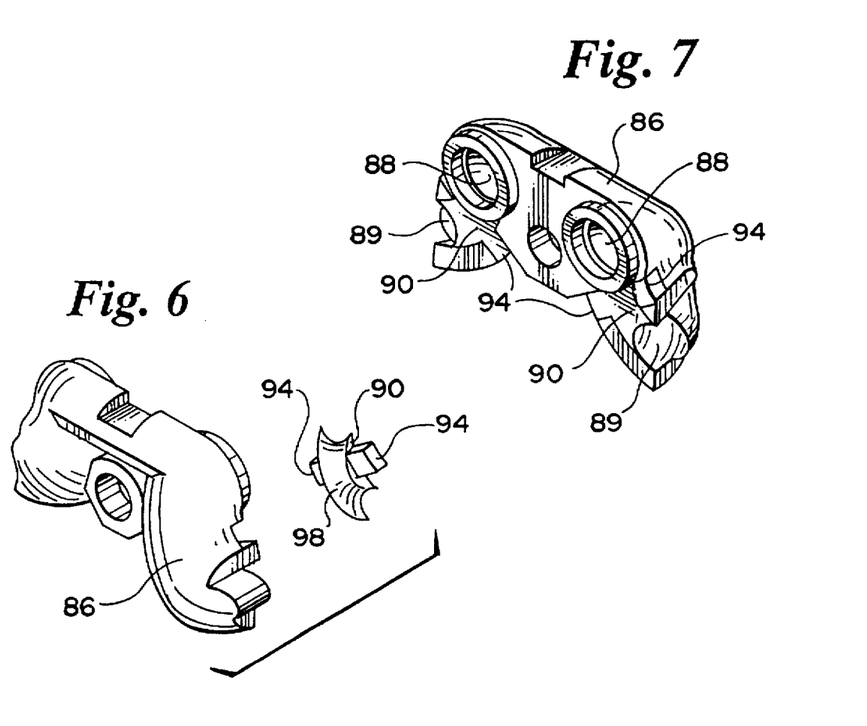
FIGS. 6 and 7 are isometric views of opposite sides of the ball return cap for the linear bearing mechanism of the present invention showing a path defining insert broken away.

A portion of the curved pathways defined by the ball returns 86 is formed by a plastic insert 90 having an inner surface portion 92 defining a portion of the ball return path. A pair of positioning wings 94 are integrally formed with the main body of the return 86 for aligning and retaining the insert 90 within the return 86. The ball return 86 is connected with the end of the carriage 12 by a threaded member 91 extending through the return 86 and into a threaded opening in the end of the carrier 12. Proper orientation of the ball return 86 results from engagement between the ends of the sleeves 84 and a relief area surrounding each of the upper openings 88 in the return 86.

With the structure of the present invention, the elongated body 15 as well as the elongated side rail members 59, 59 can be formed via an extrusion process, without critical attention being paid to tolerances. Then, during assembly, any imperfections resulting from failure to achieve exact tolerances, or any other distortions of the cylinder components, can be accommodated for by exact positioning by the rails 59, 59 prior to tightening the same to the cylinder body 15.

Although the above description of the preferred embodiment has been quite specific, it is contemplated that various modifications could be made without deviating from the spirit of the present invention. Accordingly it is intended that the scope of the present invention be dictated by the appended claim rather than by the description of the preferred embodiment.

We claim:

1. A linear motion device comprising:
   an elongated body having a longitudinal axis extending in the direction of its elongation and a body length dimension measured in the direction of said longitudinal axis;
   a carriage moveable in a linear path relative to said body along said longitudinal axis and having a carriage length dimension measured in the direction of said longitudinal axis, said carriage length being less than said body length; and
   a linear bearing means positioned between said body and said carriage for supporting said carriage for movement along said linear path, said bearing means including
   at least one elongated side rail having an elongated bearing receiving recess,
   means for connecting said side rail to said body in an adjustable, operable position,
   a first bearing member connected to said side rail within said recess, and
   a second bearing member associated with said carriage for bearing cooperation relative to said first bearing member.

2. The linear motion device of claim 1 including clamp means for retaining said first bearing member within said recess.

3. The linear motion device of claim 2 wherein said clamp means includes an elongated clamp slot formed within and extending the length of said side rail and opening to said recess.

4. The linear motion device of claim 3 wherein said means for connecting said side rail to said body includes a plurality of threaded members and wherein said plurality of threaded members extend through at least a portion of said clamp slot.

5. The linear motion device of claim 4 wherein said body is an extruded body and said side rail is an extruded side rail.

6. The linear motion device of claim 4 wherein said means for connecting said side rail to said body includes an elongated rail connection channel formed in said body and at least one threaded nut retained within said channel and adapted to receive said threaded members.

7. The linear motion device of claim 6 wherein said body is an extruded body and said side rail is an extruded side rail.

8. The linear motion device of claim 1 wherein said first bearing member is a first ball bearing race, said second bearing member is a second ball bearing race and said bearing means further includes a plurality of ball bearings positioned in bearing relationship between said first and second ball bearing races.

9. The linear motion device of claim 8 wherein said bearing comprises a recirculating ball bearing means.

10. The linear motion device of claim 4 wherein said first bearing member is a first ball bearing race, said second bearing member is a second ball bearing race and said bearing means further includes a plurality of ball bearings positioned in bearing relationship between said first and second ball bearing races.

11. The linear motion device of claim 10 wherein said bearing comprises a recirculating ball bearing means.

12. The linear motion device of claim 1 being a pneumatic cylinder having a reciprocally moveable piston within said body and means for coupling said piston to said carriage whereby said carriage is moveable with said piston.

13. The linear motion device of claim 11 being a pneumatic cylinder having a reciprocally moveable piston within said body and means for coupling said piston to said carriage whereby carriage is moveable with said piston.

14. The linear motion device of claim 13 wherein said bearing means includes a pair of side rails, each having a bearing receiving recess and each having a first bearing member received within said recess, said bearing means further including a pair of second bearing members associated with said carriage for bearing cooperation relative to said first bearing members.

15. The cylinder of claim 1 wherein said first bearing member has a first bearing length measured in the direction of said longitudinal axis and said second bearing member has a second bearing length measured in the direction of said longitudinal axis and wherein said second bearing length is less than said first bearing length.

16. The cylinder of claim 1 wherein said side rail is adjustably connected with said body to permit limited adjustable positioning of said side rail in a direction generally perpendicular to said longitudinal axis.

17. A pneumatic cylinder comprising:
   an elongated cylinder body having a longitudinal axis, a top exterior surface parallel to said longitudinal axis, a central bore extending along said longitudinal axis and a body length dimension measured in the direction of said longitudinal axis;
   a piston reciprocally moveable in said bore;
   a carriage coupled to said piston for movement therewith in the direction of said longitudinal axis and having a carriage length dimension measured in the direction of said longitudinal axis, said carriage length being less than said body length;
   a pair of side rails adjustably connected to said top exterior surface, each of said rails including a race receiving recess, a first ball bearing race within said recess and clamp means for retaining said first ball bearing race within said recess;
   a pair of second ball bearing races connected with said carriage; and
   a plurality of ball bearings positioned between said first and second bearing races.

18. The cylinder of claim 17 wherein said plurality of ball bearings are recirculating ball bearings.

19. The cylinder of claim 17 wherein said first bearing member has a first bearing length measured in the direction of said longitudinal axis and said second bearing member has a second bearing length measured in the direction of said longitudinal axis and wherein said second bearing length is less than said first bearing length.

20. The cylinder of claim 15 wherein said side rails are adjustably connected to said top extension surface to permit limited adjustable positioning in a direction generally parallel to said longitudinal axis.

* * * * *

UNITED STATES PATENT AND TRADEMARK OFFICE
CERTIFICATE OF CORRECTION

PATENT NO. : 5,555,789
DATED : September 17, 1996
INVENTOR(S) : Gary W. Rosengren et al.

It is certified that error appears in the above-indentified patent and that said Letters Patent is hereby corrected as shown below:

In column 10, line 3, delete "15" and insert --17--.

Signed and Sealed this

Tenth Day of December, 1996

Attest:

BRUCE LEHMAN

Attesting Officer     Commissioner of Patents and Trademarks